United States Patent [19]
Oliveira et al.

[11] Patent Number: 6,037,757
[45] Date of Patent: Mar. 14, 2000

[54] POWER CONTROL UNIT HAVING SWITCHING PHASE CONTROL FOR REDUCING VOLTAGE DROP AT A POWER SUPPLY

[75] Inventors: Daniel Oliveira, Soultz; Haruo Nishiyama, Colmar, both of France; Yoshifumi Maitani, Kyoto, Japan

[73] Assignee: Sharp Kabushiki Kaisha, Osaka, Japan

[21] Appl. No.: 09/139,262

[22] Filed: Aug. 25, 1998

[30] Foreign Application Priority Data

Jun. 24, 1998 [EP] European Pat. Off. ............. 98401556

[51] Int. Cl.[7] .................. G05F 1/10; G05F 5/00; G05B 24/02; H05B 1/02

[52] U.S. Cl. ................ 323/241; 323/300; 323/320; 323/234; 219/497

[58] Field of Search ................... 323/241, 237, 323/300, 319, 320, 234, 235; 219/497, 492

[56] References Cited

U.S. PATENT DOCUMENTS

| | | | |
|---|---|---|---|
| 4,449,091 | 5/1984 | Otoi | 323/236 |
| 4,461,990 | 7/1984 | Bloomer | 323/235 |
| 4,928,055 | 5/1990 | Kaieda et al. | 323/300 |
| 5,079,409 | 1/1992 | Takada et al. | 219/497 |
| 5,543,904 | 8/1996 | Kato et al. | 355/285 |
| 5,600,233 | 2/1997 | Warren et al. | 323/237 |
| 5,627,634 | 5/1997 | Koh | 399/69 |
| 5,907,743 | 5/1999 | Takahasi | 399/69 |

FOREIGN PATENT DOCUMENTS

| | | | |
|---|---|---|---|
| 0588273A1 | 9/1993 | European Pat. Off. | H05B 39/04 |
| 0588273A1 | 3/1994 | European Pat. Off. | |
| 740223A2 | 10/1996 | European Pat. Off. | G03G 15/20 |
| 836123A1 | 4/1998 | European Pat. Off. | G03G 15/20 |
| 06242644 | 9/1994 | Japan | G03G 15/00 |

*Primary Examiner*—Peter S. Wong
*Assistant Examiner*—Bao Q. Vu

[57] ABSTRACT

When the phase control is effected on a supply voltage to a load having positive resistance characteristics with respect to temperatures before a current is allowed to pass, a voltage is supplied for a current passing time T1, and the voltage is supplied for a current passing time T2 longer than the current passing time T1, and the voltage is supplied for a current passing time T3 shorter than the current passing time T2. Also, a second control pattern is effected at least once, in which the current is passed while the current passing time is kept substantially constant, then the current passing time is extended before the attenuation rate of the peak value of the resulting load current saturates, and then the current is passed while the extended current passing time is kept substantially constant. Consequently, a voltage drop can be reduced effectively without causing large distortion of the current waveform or large conduction noise by omitting an expensive noise filter or special hardware.

32 Claims, 12 Drawing Sheets

POWER CONTROL UNIT HAVING SWITCHING PHASE CONTROL FOR REDUCING VOLTAGE DROP AT A POWER SUPPLY

FIELD OF THE INVENTION

The present invention relates to a power control unit for controlling a power supply to a load like a heater of a thermal fuser provided in an image forming apparatus, such as an electrophotographic copying machine, a printer and a facsimile machine. More particularly, the present invention relates to a power control unit arranged in view of a temporal drop of a power source voltage (voltage drop) caused by a rush current flowing into the load, an occurrence of harmonic distortion (harmonics) of the current waveform caused by power supplied when effecting the phase control, and generation of conduction noise.

BACKGROUND OF THE INVENTION

For example, in an image forming apparatus, such as an electrophotographic copying machine, a printer, and a facsimile machine, an image signal is converted into an electric signal in accordance with a density of image information of the original document, based on which an electrostatic latent image is formed on a photosensitive body using a laser beam or the like. Then, the electrostatic latent image is developed into a developer image and transferred onto a sheet, after which the developer image is fused with heat generated by a heater of a thermal fuser to be fixed thereon. In this type of fuser that fuses an image onto the sheet with heating, the heater (hereinafter, referred to as fusing heater) of the thermal fuser is provided as a load. In the fusing heater, a heater lamp, such as a halogen lamp, and a heating resistor or the like is used as a heat source. The fusing heater is enclosed in a pair of fusing rollers for nipping and transporting a sheet on which the developer image is to be fused. More specifically, one or more than one fusing heater each having power ranging from some hundreds Watts to approximately two thousands Watts is provided inside either or both of the pair of fusing rollers. In case of a high-speed image forming apparatus, a fusing heater having a larger capacity is used. Further, the pair of fusing rollers are kept at a predetermined temperature by controlling power supplied to the fusing heater using a fusing heater's ON/OFF signal which is generated based on a detection result of a temperature sensor provided in such a manner to touch the surface of the pair of fusing rollers.

When the image forming apparatus has a large load having positive characteristics with respect to temperatures as a subject component to which power is supplied under control, a large current (hereinafter, referred to as rush current) passes through the load immediately after the power supply begins. In the following, how the rush current flows into the load and how the power source voltage drops as the rush current passes through the load will be explained using a halogen heater of the fuser as an example and with reference to FIG. 7.

As indicated by a curve (a), when a heater signal assumes an ON state, power is supplied to the halogen heater from a commercial power source. Since a resistance value of the halogen heater has positive characteristics with respect to temperatures, in other words, it becomes larger as the temperature of the halogen heater rises, if a current has not been supplied to the halogen heater, the halogen heater has quite a small resistance value. Generally, a resistance value at such a low temperature is $\frac{1}{10}$ of the resistance value when heated. Since power is supplied to the halogen heater having such a small resistance value, a rush current $I_1$ (a peak value of a half cycle of the current in the initial stage) flows into the halogen heater immediately after the power supply starts as indicted by a curve (c).

The halogen heater is heated as the current flows in and a temperature of the same rises and so does the resistance value. As the resistance value rises, the current flowing into the halogen heater drops and converges to a normal current $I_0$, and the halogen heater resumes to a normal state. A ratio of the rush current $I_1$ to the normal current $I_0$, $I_1/I_0$, ranges from several to ten times. In case of FIG. 7, since the halogen heater is controlled to start to light on substantially at a zero crossing point of the power source voltage waveform, the rush current can be suppressed to a relatively small value.

On the other hand, as indicated by a curve (b) in the drawing, the rush current flowing into the halogen heater in the above manner causes a voltage drop $\Delta V_1$ around an outlet of the commercial power source that supplies power to the image forming apparatus or in the other internal lines because of their own impedance. The curve (b) in the drawing represents an envelope of the voltage waveform when the voltage drops. After the current passing through the halogen heater has converged to the normal current, the voltage drop also converges to a small value $\Delta V_2$. When the power supply to the halogen heater is cut, the voltage recovers an original voltage level $V_0$.

Particularly, since the above rush current causes a significant voltage drop instantaneously, peripheral equipment or lighting equipment may be affected adversely. For example, when a voltage supplied to the lighting equipment drops, there possibly occurs a luminance flicker phenomenon (flicker). Recently, to suppress the occurrence of this phenomenon, apparatuses that consume large power with respect to the power source are regulated by the flicker test. The flicker test checks that a voltage at the power source end does not drop below a predetermined level because of the load provided in the apparatuses. In case of the image forming apparatus, the flicker test is carried out in two modes: a copy mode (the flicker test in this mode is referred to as short flicker test) and a standby mode (the flicker test in this mode is referred to as long flicker test). Thus, the flicker test is carried out based on regulation values set separately for each mode.

To suppress the problematic voltage drop, as is disclosed in Japanese Laid-open Patent Application No. 242644/1994 (Tokukaihei No. 6-242644), a control method, referred to as the phase control, for supplying power by increasing a conduction angle at which a current passes through the load step by step is known. However, when power is supplied to the load like the above-mentioned halogen heater through the phase control, the power supply starts at a point other than the zero crossing point of the voltage waveform, and a large voltage is applied abruptly to the load. Accordingly, not only the current waveform is distorted, but also conduction noise is emitted over a broad frequency band. The distortion of the current waveform adversely affects the surroundings of an outlet of the commercial power source connected to an apparatus that supplies power to the internal load through the phase control, or other apparatuses connected to the other internal lines. Also, the emitted conduction noise causes a problem that it triggers a malfunction of peripheral electronic equipment.

To eliminate the above problems, regulation is imposed by a test referred to as the harmonics test. The harmonics test checks how bad the distortion of the current waveform of FIG. 8 is with respect to the original waveform. In practice, whether a coefficient in each order of the harmonics obtained by subjecting the current waveform to the Fourier analysis is within predetermined regulation values or not is tested, and the second through fortieth harmonics are checked. The safety regulation requires the image forming apparatus to maintain the harmonic noises within the predetermined regulation values in a copy mode where a normal image is formed.

Various countermeasures are proposed to clear these regulations. For example, aforementioned Japanese Laid-open Patent Application No. 242644/1994 (Tokukaihei No. 6-242644) also discloses a technique for suppressing the occurrence of the rush current by increasing the conduction angle step by step using a softstart circuit employing a bi-directional thyristor (also known as TRIAC). When this technique is adopted, the voltage drop is suppressed effectively, but since the conventional phase control is effected, the current waveform is distorted considerably, thereby causing a large amount of conduction noise. To eliminate the adverse effect of the conduction noise on the other apparatuses, an expensive noise filter must be provided to the power source line. Thus, there is a problem that the cost is undesirably increased. Moreover, the problem of the distortion of the current waveform remains unsolved.

In the following, how the time length of the phase control period generally affects the aforementioned voltage drop, distortion of the current waveform, and conduction noise will be explained with reference to Table 1 below and FIG. 9.

TABLE 1

| PHASE CONTROL PERIOD Tph | FLICKER (VOLTAGE DROP) | HARMONICS (DISTORTION OF CURRENT WAVEFORM) | CONDUCTION NOISE |
| --- | --- | --- | --- |
| LONG | DOWN | UP | UP |
| SHORT | UP | DOWN | DOWN |

Here, the phase control is effected in such a manner that the power supply to the load is started after a predetermined period (delay time) from the zero crossing point of the voltage waveform and stopped on the zero crossing point during a predetermined period Tph (FIG. 9) after the current is allowed to flow. Subsequently, the phase control is switched to the zero crossing control for fully passing the current continuously.

In this case, as is understood from Table 1, the longer the phase control period, the smaller the voltage drop, and the shorter the phase control period, the larger the voltage drop. On the contrary, the longer the phase control period, the higher the level of the distortion of the voltage waveform and the conduction noise, and the shorter the phase control period, the lower the level of the distortion of the current waveform and the conduction noise.

SUMMARY OF THE INVENTION

It is therefore an object of the present invention to provide a power control unit which can reduce a voltage drop effectively without causing large distortion of the current waveform or large conduction noise when power is supplied to a load having a large capacity, such as a heater lamp employed in an image forming apparatus or the like.

To fulfill the above and other objects, a first power control unit of the present invention is characterized by including a switching section for adjusting a load current passing through a load having positive resistance characteristics with respect to temperatures by controlling a supply voltage having at least one polarity and supplied from an A/C power source to the load through a phase control, in which a current passing time in a half cycle of a supply voltage waveform is set before a current starts to pass, and the switching section effects the phase control on the supply voltage waveform so as to form a first control pattern, in which the switching section supplies a voltage for a current passing time T1;

the switching section then supplies a voltage for a current passing time T2, the current passing time T2 being longer than the current passing time T1; and the switching section then supplies a voltage for a current passing time T3, the current passing time T3 being shorter than the current passing time T2.

Also, a second power control unit of the present invention is characterized by including a switching section for adjusting a load current passing through a load having positive resistance characteristics with respect to temperatures by controlling a supply voltage having at least one polarity and supplied from an A/C power source to the load through a phase control, in which a current passing time in a half cycle of a supply voltage waveform is set before a current starts to pass, wherein the switching section effects the phase control on the supply voltage waveform to perform a second control pattern at least once, in which the switching section passes the current while keeping the current passing time substantially constant;

the switching section extends the current passing time before an attenuation rate of a peak value of a resulting load current saturates; and the switching section then passes the current while keeping an extended current passing time substantially constant.

According to each of the above arrangements, a voltage drop can be reduced effectively without causing large distortion of the current waveform or large conduction noise by omitting an expensive noise filter or special hardware. Also, the control can be effective using the same control method for two kinds of flicker tests (short flicker test and long flicker test) for testing a voltage drop.

For a fuller understanding of the nature and advantages of the invention, reference should be made to the ensuing detailed description taken in conjunction with the accompanying drawings.

DETAILED DESCRIPTION OF THE PREFERRED EMBODIMENTS

In the following, an example embodiment of the present invention will be explained using a digital copying machine as an example image forming apparatus of the present invention with reference to FIGS. 1 through 6, and 10 through 12.

Figure 2:
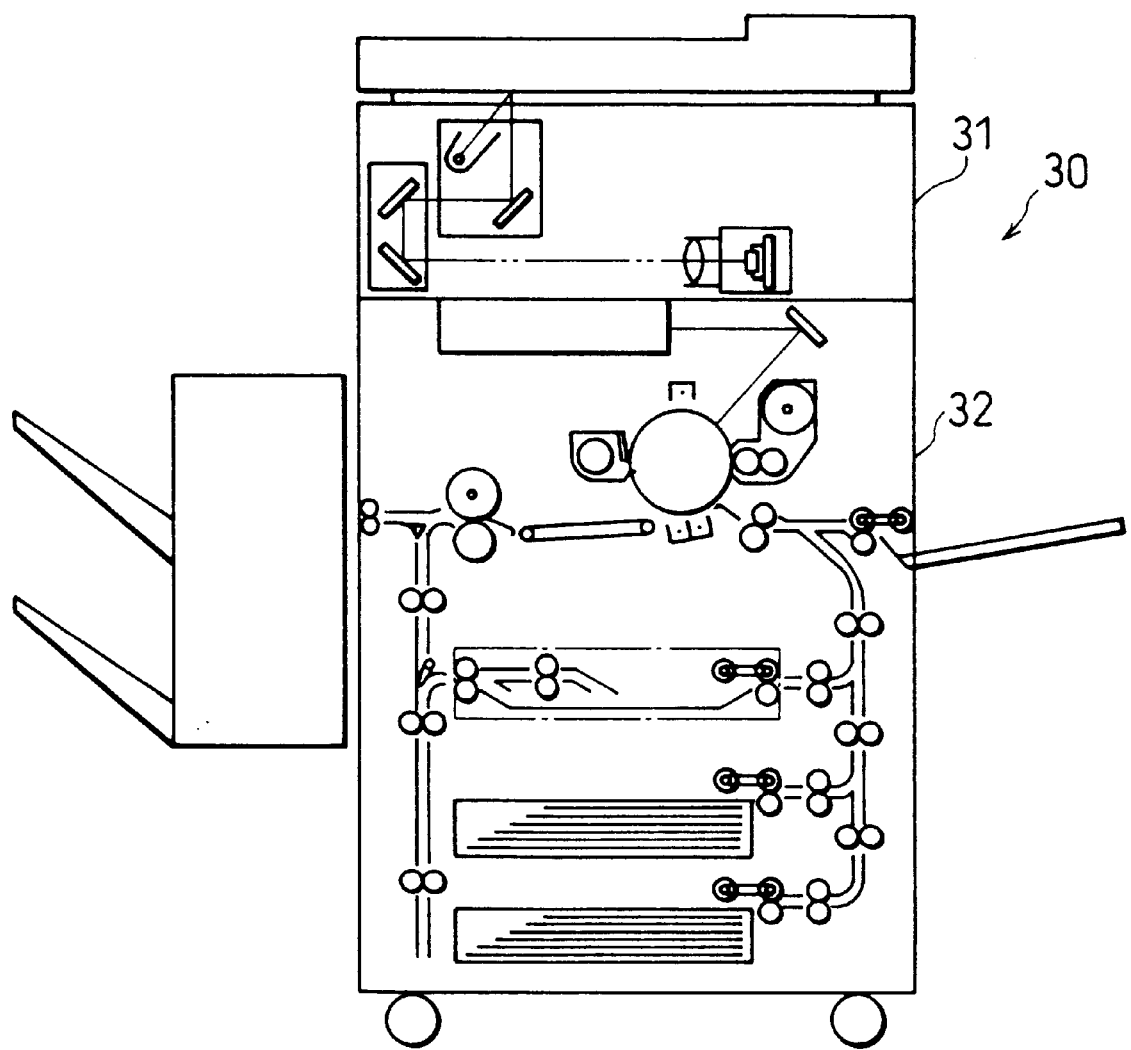
FIG. 2 is a view explaining each portion of an image forming apparatus.

In the first place, each component of the image forming apparatus will be described briefly. The image forming apparatus is a digital copying machine herein. As shown in FIG. 2, a digital copying machine 30 basically comprises a scanner section 31, an image processing section (not shown), and a recording section 32. The scanner section 31 reads an image on an original document and converts the same into a corresponding electric signal, and sends the electric signal to the image processing section as image data. The image processing section processes the image data thus received in predetermined manners. The processed image data are irradiated onto a photosensitive body provided inside an electrophotographic image forming device enclosed in the recording section 32 by means of a laser writing device also enclosed in the recording section 32, whereby an electrostatic latent image corresponding to the image on the original document is formed. The electrostatic latent image is developed into a developer image by a developing device first, and thence transferred onto a sheet. The sheet having thereon the developer image is transported to a fuser provided at the downstream end along a direction in which the sheet is transported inside the image forming section, and the developer image is fused onto the sheet.

Figure 3:
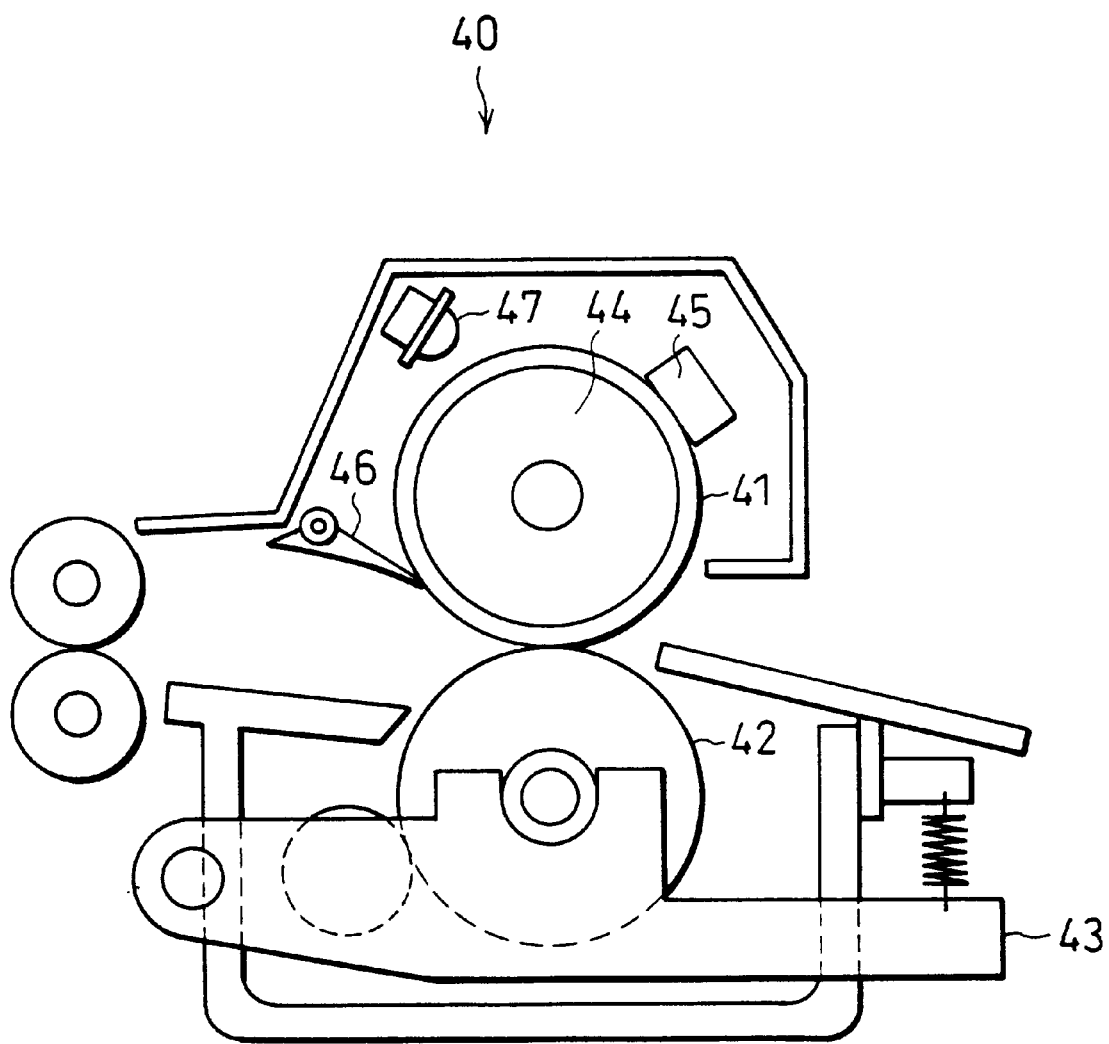
FIG. 3 is a view explaining each portion of a fuser.

Next, the fuser will be explained in detail with reference to FIG. 3. As shown in the drawing, a fuser 40 is provided with an upper fusing roller 41 and a lower fusing roller 42, which are pressed against each other by pressure applier 43. The upper and lower fusing rollers 41 and 42 can be rotated by a driver (not shown), so that they can nip and transport a sheet. A fusing heater 44 is provided inside the upper fusing roller 41. Also, a fusing thermistor 45 and a fusing separating claw 46 are provided to touch the outer surface of the upper fusing roller 41. Further, a temperature fuse 47 is provided apart from the upper fusing roller 41.

Figure 1:
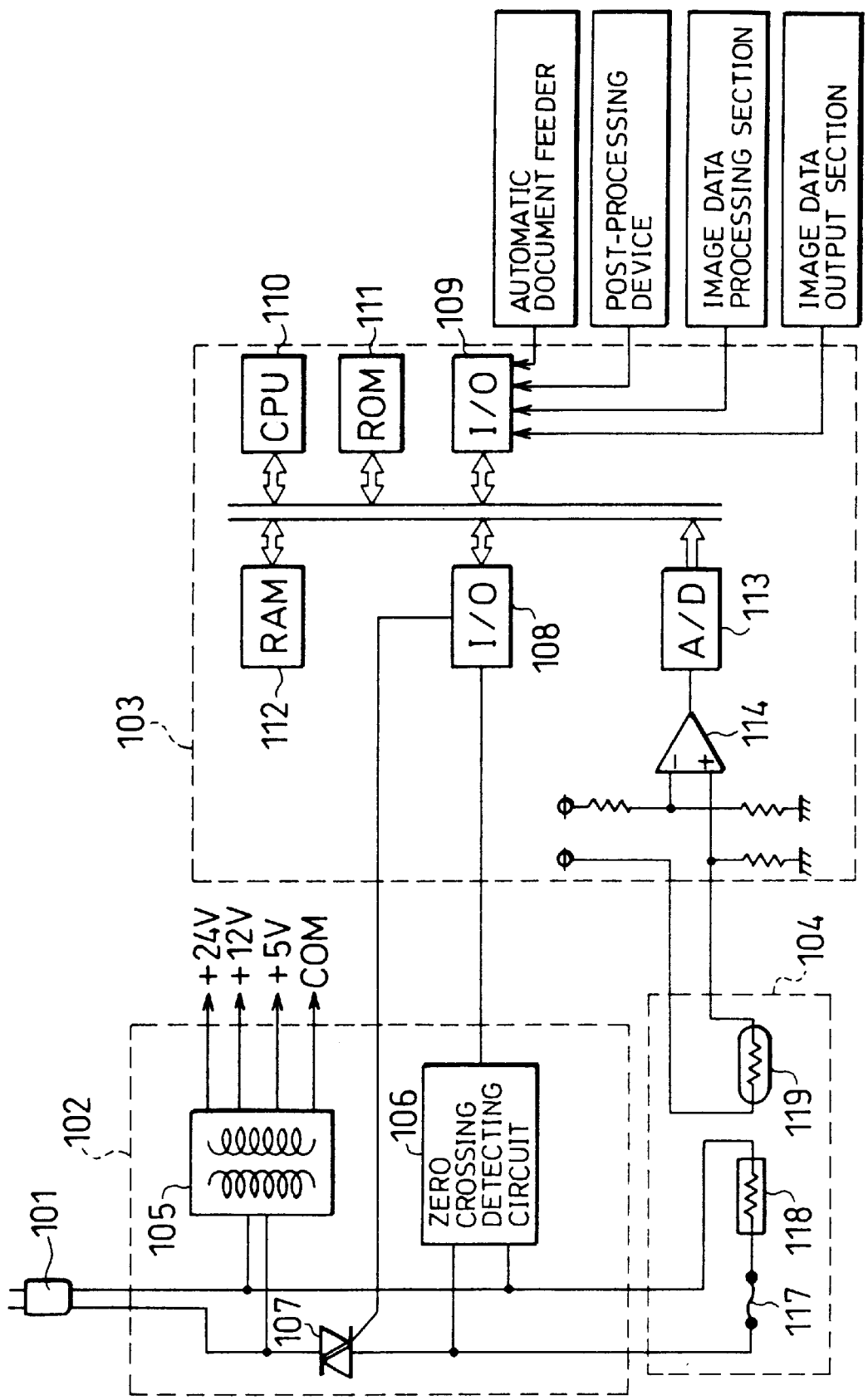
FIG. 1 is a block diagram schematically showing an arrangement of a fusing heater control circuit in accordance with an example embodiment of the present invention.

Next, the arrangement of a power control unit of the present invention will be explained with reference to FIG. 1. FIG. 1 depicts the arrangement of the major portion of a fusing heater control circuit serving as the power control unit in the digital copying machine 30. The fusing heater control circuit of FIG. 1 basically comprises an A/C power source connecting plug 101, a power supply unit 102, a control panel 103, and a fusing unit 104. The power supply unit 102 encloses a power source transformer 105, a zero crossing detecting circuit 106, a bi-directional thyristor (also known as TRIAC) 107. The control panel 103 encloses an input/output device (I/O) 108, another input/output device (I/O) 109, a CPU (Central Processing Unit) 110, a ROM (Read Only Memory) 111, a RAM (Random Access Memory) 112, an A/D converter 113, and an amplifier 114. When the A/C power source connecting plug 101 is connected to the A/C power source, power on the first end is converted to power on the second end by the power source transformer 105, so that predetermined power is supplied to the electrical components. Also, the fusing unit 104 encloses a temperature fuse 117, a fusing heater 118, and a fusing thermistor 119.

As has been explained, the fusing heater 118 is provided inside the upper fusing roller 41, and confers heat to both the upper and lower fusing rollers 41 and 42. The fusing thermistor 119 detects a surface temperature of the fusing roller 118, and sends a signal corresponding to the detected temperature to the CPU 110 through the A/D converter 113. The fusing heater 118 and bi-directional thyristor 107 are connected in series with respect to the A/C power source. The bi-directional thyristor 107 allows or interrupts the power supply to the fusing heater 118 from the power source depending on a signal received from the CPU 110 through the input/output device 108. The zero crossing detecting circuit 106 detects a zero crossing point of a voltage applied from the A/C power source, and sends a signal to the CPU 110 through the input/output device 108. The temperature fuse 117 is connected to the fusing heater 118 in series to prevent ignition or the like in case that the fusing thermistor 119 or bi-directional thyristor 107 fails and the power is kept supplied to the fusing heater 118.

Here, the power supply unit 102 and control panel 103 form switching means.

Next, a method of supplying power to the fusing heater 118 by controlling the aforementioned hardware will be explained in the following using an example case, where the digital copying machine 30 is activated as its main switch is turned ON while the power source of the same has stayed OFF (the main switch has been turned OFF). Here, the digital copying machine 30 is designed to operate on 230V and 50 Hz.

The CPU 110 controls an overall operation of the digital copying machine 30 based on a control program pre-stored in the ROM 111, and the switching means operates at a command from the CPU 110. In the following, how the CPU 110 controls the switching means will be explained.

A control program for controlling the switching means is stored in the ROM 111, and the CPU 110 controls the switching means by retrieving the content in the ROM 111 when necessary. Also, control data for controlling the operation of the switching means are also stored in the ROM 111. The CPU 110 also retrieves the control data when necessary, and uses the same to control the switching means.

Next, the operation of the digital copying machine 30 when its main switch is turned ON while its power source has stayed OFF will be explained. Here, the phase control is defined as a control to set a current passing time in each half cycle of the voltage waveform. Also, the full current passing is defined as a control to set a delay time for the supply voltage to 0 (zero), so that the entire half cycle will be the current passing time. Further, the zero crossing control is defined as a control to keep effecting the full current passing.

To begin with, when the main switch of the digital copying machine 30 is turned ON, power is supplied to the control circuit of the digital copying machine 30, whereupon the control circuit is ready to control the digital copying machine 30. To make the digital copying machine 30 ready, the CPU 110 activates the mechanism driver, so that the image forming section carries out the pre-processing process. While at the same time, the CPU 110 supplies power to the fusing heater 118 to raise a temperature thereof to a predetermined level. As has been explained, if the current passing control, such as the one disclosed in Japanese Laid-open Patent Application No. 242644/1994 (Tokukaihei No. 6-242644), is effected on the fusing roller 118, there occurs problems, such as the voltage drop, distortion of the current waveform, and conduction noise. Thus, the CPU 110 effects a phase control different from the above conventional phase control. The CPU 110 effects this phase control repetitively until the risk of the voltage drop is no longer important. Later, the phase control is switched to the zero crossing control. In this manner, the fusing roller 118 is kept heated until the temperature of the same rises to the predetermined level.

Figure 4:
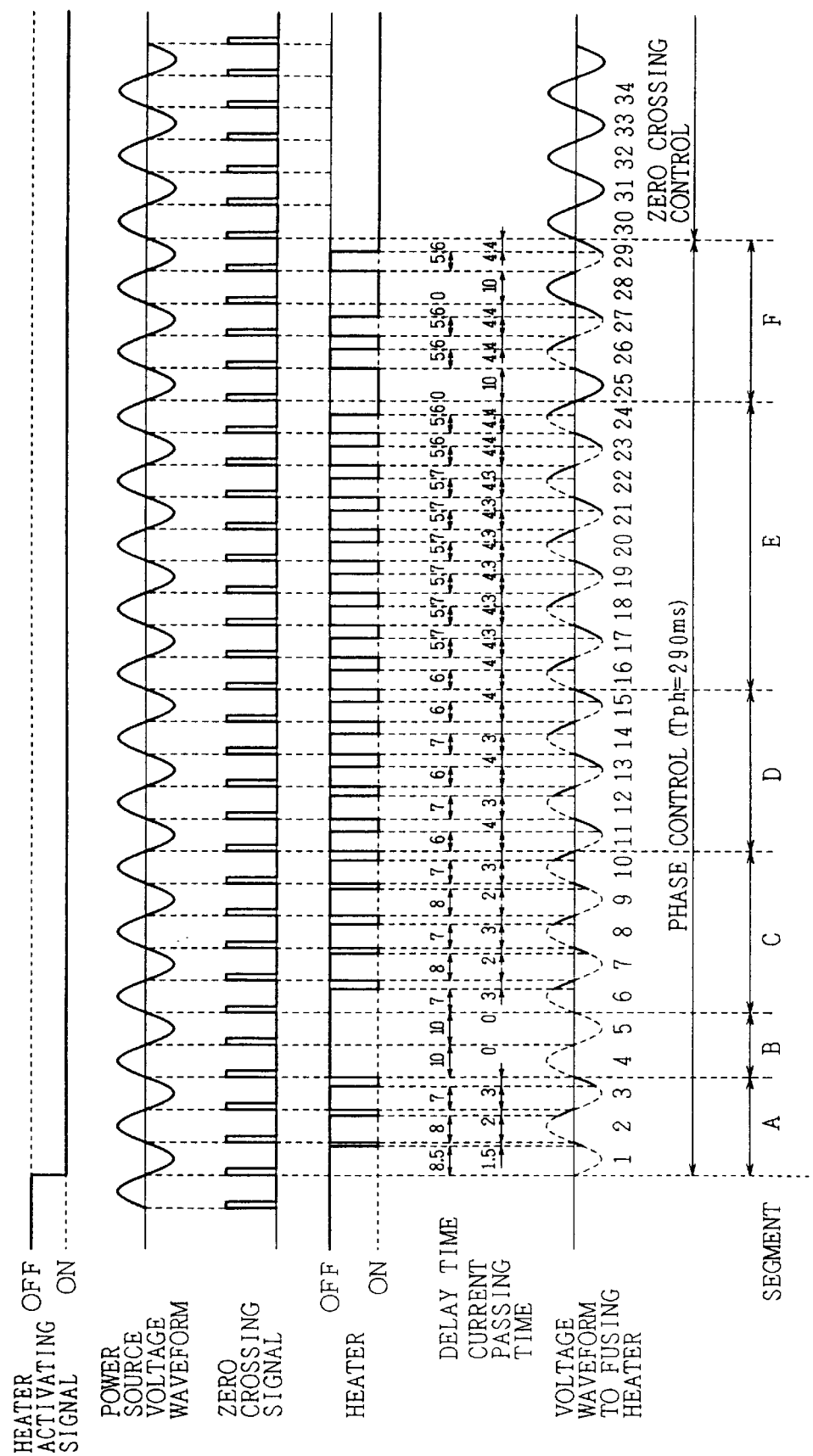
FIG. 4 is a time chart illustrating how the phase control is effected.
Figure 5:
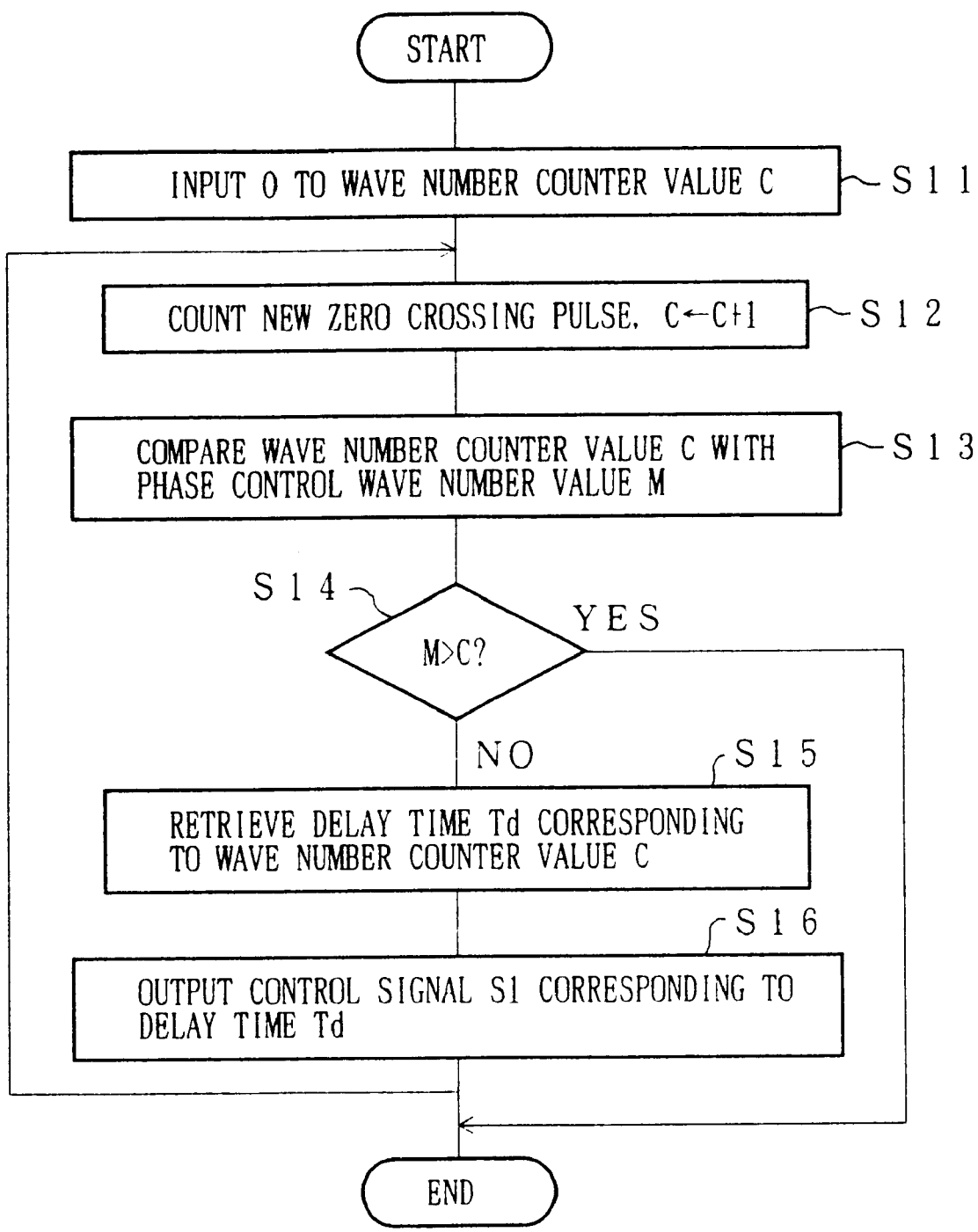
FIG. 5 is a flowchart detailing a process of setting a phase control period based on a phase control wave number value stored in a ROM of FIG. 1.

Next, how the CPU 110 effects the current passing control on the fusing roller 118 will be explained with reference to Tables 2 and 3 below and FIGS. 4 and 5. FIG. 4 shows a time chart showing how a fusing heater current is controlled through a software program run by the CPU 110. Table 2 and Table 3 continued from Table 2 show control data stored in the ROM 111 for controlling the current passing time for the fusing heater 118 by controlling the ON/OFF action of the bi-directional thyristor 107. FIG. 5 is a flowchart detailing an operation of the CPU 110 during the phase control period. In the following, half cycles are divided into some segments as indicted in FIGS. 4 and 5 and Tables 2 and 3 for the explanation's conveniences.

TABLE 2

| SEG-MENT | ROM DATA | | CURRENT PASSING | |
|---|---|---|---|---|
| | | | DELAY TIME (ms) | |
| | WAVE NUMBER COUNT VALUE C | TIME Td (ms) | UPPER POLARITY | LOWER POLARITY |
| A | 1ST HALF CYCLE | 8.5 | | 1.5 |
| | 2ND HALF CYCLE | 8 | 2 | |
| | 3RD HALF CYCLE | 7 | | 3 |
| B | 4TH HALF CYCLE | 10 | 0 | |
| | 5TH HALF CYCLE | 10 | | 0 |
| C | 6TH HALF CYCLE | 7 | 3 | |
| | 7TH HALF CYCLE | 8 | | 2 |
| | 8TH HALF CYCLE | 7 | 3 | |
| | 9TH HALF CYCLE | 8 | | 2 |
| | 10TH HALF CYCLE | 7 | 3 | |
| D | 11TH HALF CYCLE | 6 | | 4 |
| | 12TH HALF CYCLE | 7 | 3 | |
| | 13TH HALF CYCLE | 6 | | 4 |
| | 14TH HALF CYCLE | 7 | 3 | |
| | 15TH HALF CYCLE | 6 | | 4 |
| E | 16TH HALF CYCLE | 6 | 4 | |
| | 17TH HALF CYCLE | 5.7 | | 4.3 |
| | 18TH HALF CYCLE | 5.7 | 4.3 | |
| | 19TH HALF CYCLE | 5.7 | | 4.3 |
| | 20TH HALF CYCLE | 5.7 | 4.3 | |
| | 21ST HALF CYCLE | 5.7 | | 4.3 |
| | 22ND HALF CYCLE | 5.7 | 4.3 | |
| | 23RD HALF CYCLE | 5.6 | | 4.4 |
| | 24TH HALF CYCLE | 5.6 | 4.4 | |

TABLE 3

| SEG-MENT | ROM DATA | | CURRENT PASSING | |
|---|---|---|---|---|
| | | | DELAY TIME (ms) | |
| | WAVE NUMBER COUNT VALUE C | TIME Td (ms) | UPPER POLARITY | LOWER POLARITY |
| F | 25TH HALF CYCLE | 0 | | 10 |
| | 26TH HALF CYCLE | 5.6 | 4.4 | |
| | 27TH HALF CYCLE | 5.6 | | 4.4 |
| | 28TH HALF CYCLE | 0 | 10 | |
| | 29TH HALF CYCLE | 5.6 | | 4.4 |

As FIGS. 4 and 5 reveal, when a heater activating signal switches ON, the CPU 110 outputs a signal (HEATER ON) to supply power to the fusing heater 118 with a predetermined delay time from a zero crossing signal outputted from the zero crossing detecting circuit 106 to indicate a zero crossing point, whereby the fusing heater 118 starts to pass the current. The CPU 110 controls the delay time until the start of the current passing in each half cycle of the voltage waveform based on the detected zero crossing point and the ROM data. Consequently, the current passing time in each half cycle of the voltage waveform is controlled in the following manner.

That is, as is detailed in FIG. 5, when the zero crossing signal corresponding to the A/C power source voltage waveform interrupts after the power source is turned ON and the CPU 110 has started the program control of the digital copying machine 30, a control program corresponding to the control mode starts to run. The control program is stored in the ROM 111 for each control mode. When the zero crossing signal interrupts the program, the CPU 110 initializes the wave number counter value C (S11), whereupon a counter starts to count up a zero crossing pulse at each zero crossing timing of the power source voltage (S12). Then, the CPU 110 compares the wave number counter value C with the phase control number wave value M pre-stored in the ROM 111 (S13 and S14). The CPU 110 retrieves a delay time Td corresponding to the wave number counter value C as the ROM data for each half cycle of the A/C power source (S15), and outputs a control signal S1 corresponding to the delay time Td also as the ROM data (S16). In the present example, M=29. In this manner, the delay time Td is determined arbitrary in accordance with the program stored in the ROM 111, and the phase control is effected. The phase control is effective repetitively for each half cycle until the risk of the voltage drop is no longer important. When the delay control pattern ends, the A/C voltage of the fusing heater 118 is switched to a continuous ON state.

Incidentally, let the half cycles of the voltage waveform after the point where the fusing heater 118 starts to pass the current be successively the first half cycle, second half cycle, . . . , twenty-ninth half cycle, . . . for the explanation's convenience. Then, given 50 Hz as the frequency of the power source voltage, each half cycle of the voltage waveform is 10 ms, and the delay time until the start of the current passing is controlled in a range between 0 ms (the current is allowed to pass for the entire half cycle) and 10 ms (no current is allowed to pass for the entire half cycle) In the present example, the phase control is effected from the first through the twenty-ninth half cycles. In other words, the phase control period is 290 ms, after which the phase control is switched to the zero crossing control.

In the following, the phase control period will be explained in detail using an example case practically adopting the power control method of the present invention with reference to the current passing time chart of FIG. 4 and the current waveform of FIG. 6.

From the first through third half cycles (Segment A), the current passing time is gradually extended from a small value. During the fourth and fifth half cycles (Segment B), the current passing is suspended. This is because during the period from the first through fifth half cycles, the resistance value of the fusing heater is so small that a large rush current flows in if the current passing time in each half cycle is set too long. To prevent this inconvenience, relatively short current passing times compared with the current passing times after the fifth half cycles are selected, so that the fusing heater is heated gradually. However, if the fusing heater is heated for a too short current passing time in the initial stage, for example, 1 ms in the present example, the phase control must be effected more often. In other words, the phase control period is extended, and this will be a disadvantage to the harmonics test and conduction noise test. Thus, the current passing time can be adjusted in response to margins with respect to the distortion of the current waveform and conduction noise. Also, during the fourth and fifth half cycles, no current is allowed to pass. The reason why is as follows: the peak value of the current is considerably large due to the current passed up to the third half cycle, and if the current is allowed to pass also in the fourth and fifth half cycles under these conditions, the peak value of the current waveform is further increased, which poses a significant risk of triggering a large voltage drop. Thus, to prevent such a large voltage drop, no current is allowed to pass during the fourth and fifth half cycles. In the initial stage where the current passing starts, an optimal current passing time to obtain a current peak value such that does not trigger a large voltage drop depends on the wattage of the fusing heater serving as the load, temperature at the current passing, power source voltage, power source frequency, etc. Conversely, such an optimal current passing time can be adjusted in accordance with the aforementioned factors.

In the present example, since the current passing time in the third half cycle is set to 3 ms, the current passing time is set to 0 (zero) in the fourth and fifth half cycles. However, if there is no risk of triggering a large voltage drop, the half cycles (Segment B of the fourth and fifth half cycles) where no current is allowed to pass can be omitted, so that the control is switched to the one that attenuates the peak value of the current waveform for a substantially constant current passing time (3 ms herein) as will be described below. When the segment where no current is allowed to pass is omitted, (1) the current passing time in the third half cycle, and (2) the substantially constant current passing time in the control such that attenuates the peak value of the current waveform must be cut shorter (to 2.7 ms, for example) compared with the conditions of the present example case.

Next, from the sixth through tenth half cycles (Segment C), the resistance value of the fusing heater increases compared with the initial one, but remains relatively small. Thus, if the current passing time is too long, the peak value of the current waveform increases and so does an amount of the voltage drop. To eliminate this problem, relatively short current passing times compared with the current passing times after the eleventh half cycles are set. For example, of the current waveform in the above segment in FIG. 6, the current passing time in the half cycles having the lower polarity is set to 2 ms, while the current passing time in the half cycles having the upper polarity is set to 3 ms. There are two reasons why the current passing time in the half cycles having the lower polarity is shorter (by 1 ms) than the current passing time in the half cycles having the upper polarity. The first reason is to raise the resistance value of the fusing heater by heating the same for the possible longest current passing time (3 ms) in the sixth half cycle, so that a delay in heating caused by setting the current passing time to 0 (zero) in the fourth and fifth half cycles can be recovered. The second reason is not to trigger a large voltage drop. More specifically, since the resistance value of the fusing heater is not so large, the peak value of the current waveform becomes such a large value that triggers a large voltage drop under these conditions, if the current passing time in the half cycles having the lower polarity is set as long as or longer than the current passing time set long in the half cycles having the upper polarity.

During the segment from the sixth through tenth half cycles, a constant current passing time is set in the half cycles having the same polarity. This is done so to wait for the peak value of the current waveform to attenuate (see attenuation curves (a) and (b) of the peak values of the current waveform). Unlike the case where the substantially constant current passing time is set in this segment, if the current passing time is cut shorter in the later half cycles, the phase control must be effected more often. This will be a disadvantage to the prevention of the distortion of the current waveform and conduction noise. On the other hand, if the current passing time is extended in the later half cycles, the peak value of the current waveform becomes so large that it triggers a large voltage drop if the current passing time is extended too long.

During the segment from the sixth through tenth half cycles, the current passing time in the first sixth half cycle is set to 3 ms, which is rather long as a current passing time in the initial stage. Hence, the peak value of the current waveform in the sixth half cycle becomes large. Therefore, to lower the peak value of the current waveform in the seventh half cycle, the current passing time in the half cycles having the lower polarity is set 1 ms shorter. However, the current passing times in the sixth and seventh half cycles may be set to close values or an identical value, so that the peak value becomes too large neither in the sixth nor seventh half cycle. To be more specific, the current passing times are respectively set to 3 ms and 2 ms in the sixth and seventh half cycles herein, but instead, they can be set to 2.5 ms and 2.4 ms (or 2.5 ms), respectively.

Next, during the segments (Segments D and E) from the eleventh through twenty-fourth half cycles, the current passing times are set relatively long compared with those set in up to the tenth half cycles. Throughout these segments, the current passing times are extended step by step, so that the current passing time in the twenty-fourth half cycle is almost as long as ½ half cycle (5 ms in this example). In the following, these two segments will be explained in detail.

During the segment (Segment D) from the eleventh through fifteenth half cycles, since the peak value of the current waveform in the last half cycle (ninth half cycle) having the lower polarity in the preceding segment (the segment from the sixth through tenth half cycles) is satisfactorily small, the current passing time in three half cycles (eleventh, thirteenth, and fifteenth half cycles) having the lower polarity out of the eleventh through fifteenth half cycles is set to 4 ms, which is 2 ms longer than the current passing time in the half cycles having the same polarity in the preceding segment. On the other hand, the current passing time in two half cycles (twelfth and fourteenth half cycles) having the upper polarity out of the eleventh through fifteenth half cycles is set same as the current passing time (3 ms) in the half cycles having the upper polarity in the preceding segment. Since the peak value of the current waveform in the eleventh half cycle is considerably large, if the current passing time in the twelfth half cycle is set to 4 ms, the peak value of the current in the twelfth half cycle becomes so large that it triggers a large voltage drop. To eliminate this inconvenience, the current passing time in the half cycles having the upper polarity is set to 3 ms, which is same as the current passing time in the segment from the sixth through tenth half cycles. Consequently, the fusing heater is heated while the peak value of the current waveform in the half cycles (eleventh, thirteenth, and fifteenth half cycles), having the lower polarity and the current passing times of 4 ms, is controlled not to become too large.

Next, during the segment (Segment E) from the sixteenth through twenty-fourth half cycles, the peak value of the current waveform in the half cycles (sixth, eighth, tenth, twelfth, and fourteenth half cycles), having the upper polarity and the current passing times of 3 ms, attenuates significantly (see attenuation curve (a)). In the fourteenth half cycle, the peak value of the current waveform is reduced to such a small value that the current passing time in the following half cycle (sixteenth half cycle) having the upper polarity can be modified. Thus, like in the eleventh half cycle, the current passing time in the sixteenth half cycle is set to 4 ms, which is 1 ms longer than the one set in the fourteenth half cycle.

The peak value of the current waveform in the sixteenth half cycle is almost as large as the peak value of the current waveform in the fifteenth half cycle, and both the peak values of the current waveform in these half cycles are not so large. Thus, the current passing times in the seventeenth through twenty-second half cycles are set 0.3 ms longer to 4.3 ms. If the current passing time is extended too long, the current passing starts near the center area of the half cycle, which results a large time integral value of the voltage waveform per unit time. Hence, like in the sixteenth half cycle, if the current passing time is extended 1 ms longer, the peak value of the current waveform increases as well. This is the reason why the current passing time is extended only by 0.3 ms.

In the twenty-third and twenty-fourth half cycles, the current passing time is extended 0.1 ms to 4.4 ms.

In this manner, during the sixth through twenty-fourth half cycles, as a method of shortening a phase control effecting period (Tph), the current passing times in the half cycles having the same polarity are made substantially constant to wait for the peak value of the current waveform in these half cycles to attenuate. Then, the current passing time in the later half cycles having the same polarity is extended. In case of FIG. 6, as the attenuation curve (a) of the peak value of the current waveform in each of the sixth, eighth, tenth, twelfth, and fourteenth half cycles shows, after the peak value of the current waveform in the half cycles having the upper polarity has attenuated, the current passing time in the sixteenth half cycle having the same polarity is extended longer than the current passing time in the fourteenth half cycle, so that the peak value of the current waveform in the sixteenth half cycle becomes larger than the peak value of the current waveform in the fourteenth half cycle. Likewise, as the attenuation curve (b) of the peak value of the current waveform in the seventh and ninth half cycles having the lower polarity of FIG. 6 shows, the current passing time in the eleventh half cycle having the same polarity is extended longer than the current passing time in the ninth half cycle after the peak value of the current waveform in the half cycles having the lower polarity has attenuated, so that the peak value of the current waveform in the eleventh half cycle becomes larger than the peak value of the current waveform in the ninth half cycle.

In the present example, during the segment from the sixth through ninth half cycles, a position of the attenuation curve (attenuation curve (b)) of the peak value of the current waveform in the half cycles having one polarity with respect to the time axis, in other words, a distance between the curve and horizontal axis, is closer (shorter) than a position of the attenuation curve (attenuation curve (a)) of the peak value of the current waveform in the half cycles having the other polarity with respect to the time axis, that is, a distance between the curve and the horizontal axis. This arrangement is preferable because it can prevent the peak value of the current waveform from becoming too large. However, the positions of the curves with respect to the time axis do not have to be arranged in the above manner, and can be selected arbitrarily under the conditions that vary from one type of apparatus to another.

In the present example, substantially the constant current passing times are selected, so that the peak value of the current waveform in the half cycles having the same polarity does not generate a target voltage drop amount (the maximum allowable amount of the voltage drop), and the phase control is effected for substantially the same current passing time until the peak value of the current waveform in the half cycles having the same polarity attenuates to a level such that allows an extension of the current passing time. Thus, a voltage drop can be smaller than the target. Also, in the present example, as mentioned above, substantially constant current passing times are selected, so that the peak value of the current waveform in the half cycles having the same polarity does not generate a target voltage drop amount, while only the half cycles having a large attenuation rate of the peak value of the current waveform over time are used, and the half cycles having a small attenuation rate are not used. "The attenuation rate is large" means that the peak value of the current waveform attenuates considerably per unit time. To be more specific, when the attenuation rate is reduced to a certain level, the current passing time is extended to draw a new attenuation curve, so that the attenuation rate increases again. Consequently, the resistance value of the fusing heater serving as the load rises above a predetermined value faster, thereby making it possible to cut the phase control period shorter. Thus, the distortion of the current waveform and conduction noise can be reduced effectively. Hence, it can be concluded that not only the voltage drop can be made smaller than the target, but also the distortion of the current waveform and conduction noise can be reduced effectively.

As has been explained, during the segments up to the twenty-fourth half cycles, the current passing times are approximated to ¼ cycle of the power source voltage. "The ¼ cycle of the power source voltage" corresponds to a period as long as ½ of the half cycle, that is, 5 ms in the present example. In addition, the half cycles having a large attenuation rate in the attenuation curve of the peak value of the current waveform and having the same polarity and substantially the constant current passing times are used.

Next, the segment (Segment F) from the twenty-fifth through twenty-ninth half cycles will be explained. The phase control period from the first through twenty-fourth half cycles is relatively short 240 ms. Thus, at this point, the resistance value of the fusing heater has not risen to a satisfactory level to switch to the zero crossing control up to this point to effect the full current passing on the continuous half cycles. Thus, the current passing time is extended from the current passing time in the preceding half cycle (twenty-fourth half cycle). Here, the current passing time in the twenty-fifth half cycle is extended to 10 ms, meaning that the current is allowed to pass for the entire half cycle. In the twenty-sixth and twenty-seventh half cycles, the current passing times are cut shorter (to 4.4 ms) than the one in the twenty-fifth half cycle. Further, a current passing time (10 ms) as long as the one in the twenty-fifth is set in the twenty-eighth half cycle. In the twenty-ninth half cycle, the current passing time is cut shorter to 4.4 ms from the one set in the preceding twenty-eighth half cycle. Subsequently, the phase control is switched to the zero crossing control in the thirtieth half cycle.

The current passing times are arranged in the above manner because, as previously mentioned, the resistance value of the fusing heater has not risen to satisfactory level to switch to the zero crossing control in the twenty-fifth half cycle. To solve this problem, in the twenty-fifth half cycle, a thermal amount to heat the fusing heater is increased to raise the resistance value of the fusing heater faster.

Also, as has been explained, in the twenty-sixth and twenty-seventh half-cycles, the current passing times are set shorter than the one set in the twenty-fifth half cycle. In this manner, the half cycles having the current passing times as long as or close to the one set in the twenty-fifth half cycle are arranged not to be continuous. An increase amount of the voltage drop is suppressed by this arrangement. In other words, since the voltage drop depends on a magnitude of the current passing per unit time, if the half cycles having long current passing times are continuous, a considerably larger voltage drop is triggered. To solve this problem, the half cycles having long current passing times are arranged not to be continuous as has been explained.

As has been explained, in the twenty-eighth and twenty-ninth half cycles, the fusing heater is heated under the control in the same manner as in the twenty-fifth through twenty-seventh half cycles. After the resistance value of the fusing heater is raised satisfactorily, the phase control is switched to the zero crossing control in the thirtieth half cycle. This is because the resistance value of the fusing heater has not risen to a satisfactory level when the current passing in the twenty-seventh half cycle ends, and the control effected during the twenty-fifth through twenty-seventh half cycles is repeated in and after the twenty-eighth half cycle.

During the segment of five half cycles from the twenty-fifth through twenty-ninth half cycles, the fusing heater is further heated by combining the half cycles having relatively long current passing times (power per half cycle is large) and the half cycles having relatively short current passing times (power per half cycle is small), so that the phase control can be switched to the zero crossing control earlier. If, instead, the phase control is effected as was up to the twenty-fourth half cycles, that is, in the same manner by using only the half cycles having a large attenuation rate in the attenuation curve of the peak value of the current waveform obtained by the phase control using substantially the constant current passing times, since the resistance value of the fusing heater has not risen to a satisfactory level, more than five half cycles are necessary between the twenty-fourth half cycle and the switching point to the zero crossing control. Hence, in this case, the repetitive number of the phase control is increased, which is a disadvantage to the prevention of the distortion of the current waveform and conduction noise.

As has been explained, in these five half cycles from the twenty-fifth through twenty-ninth half cycles, the largeness of the peak value of the current waveform in the continuous half cycles affects the largeness of the voltage drop, and the same can be said throughout the entire segments. However, in the other segments, the circumstances are different. That is, (1) since the current passing times vary, so does the value obtained by integrating the current waveform in the time axis direction, and (2) the resistance values of the fusing heater vary with the temperatures of the fusing heater. Therefore, it is especially crucial that the current passing times must be selected to go along with the above-explained control pattern. In other words, the current passing times such that realize the aforementioned control pattern should be selected in response to the largeness of the load having the positive characteristics with respect to temperatures, so that a large voltage drop will not occur.

Figure 6:
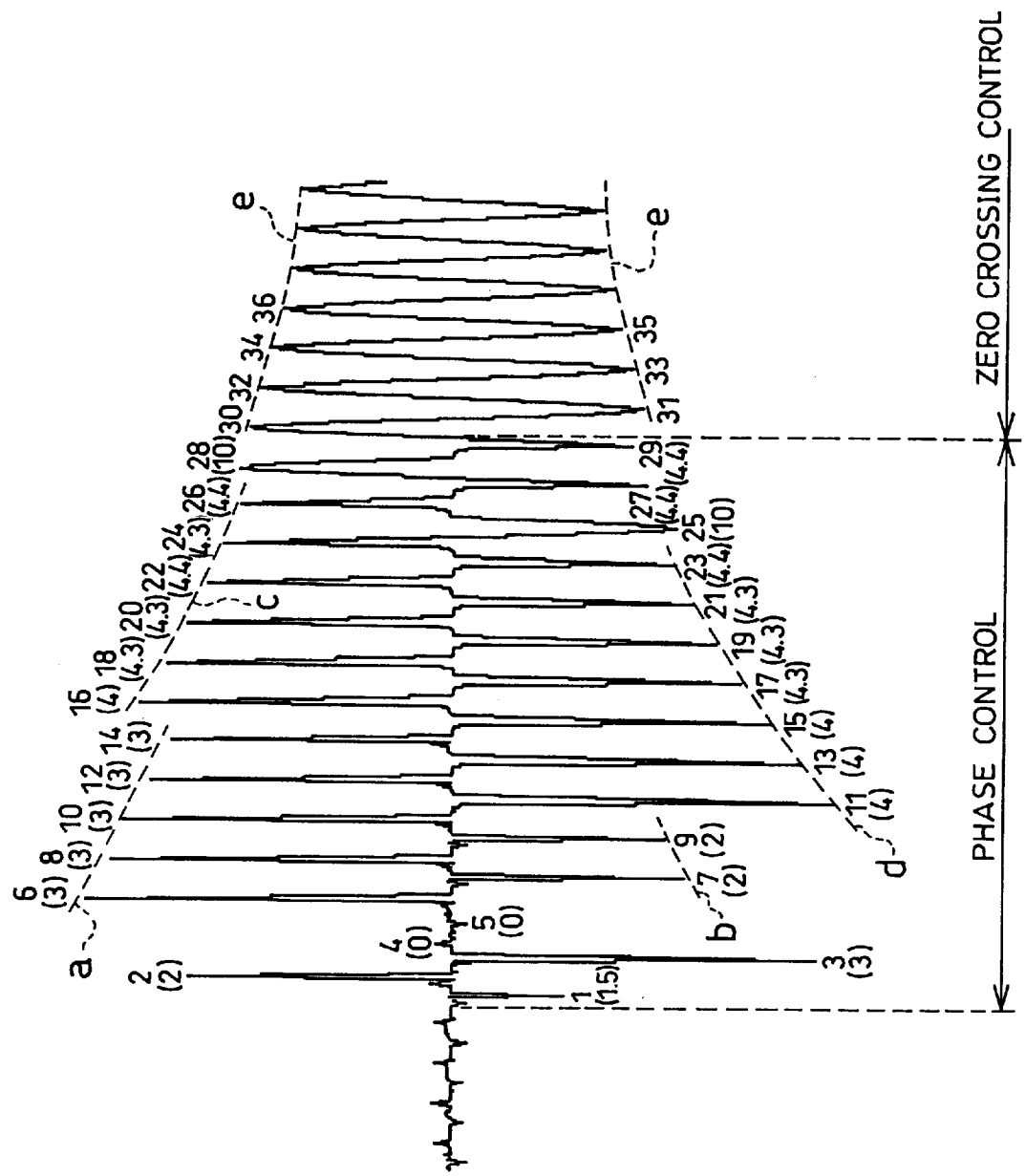
FIG. 6 is a graph showing a current waveform when the phase control is effected.
Figure 7:
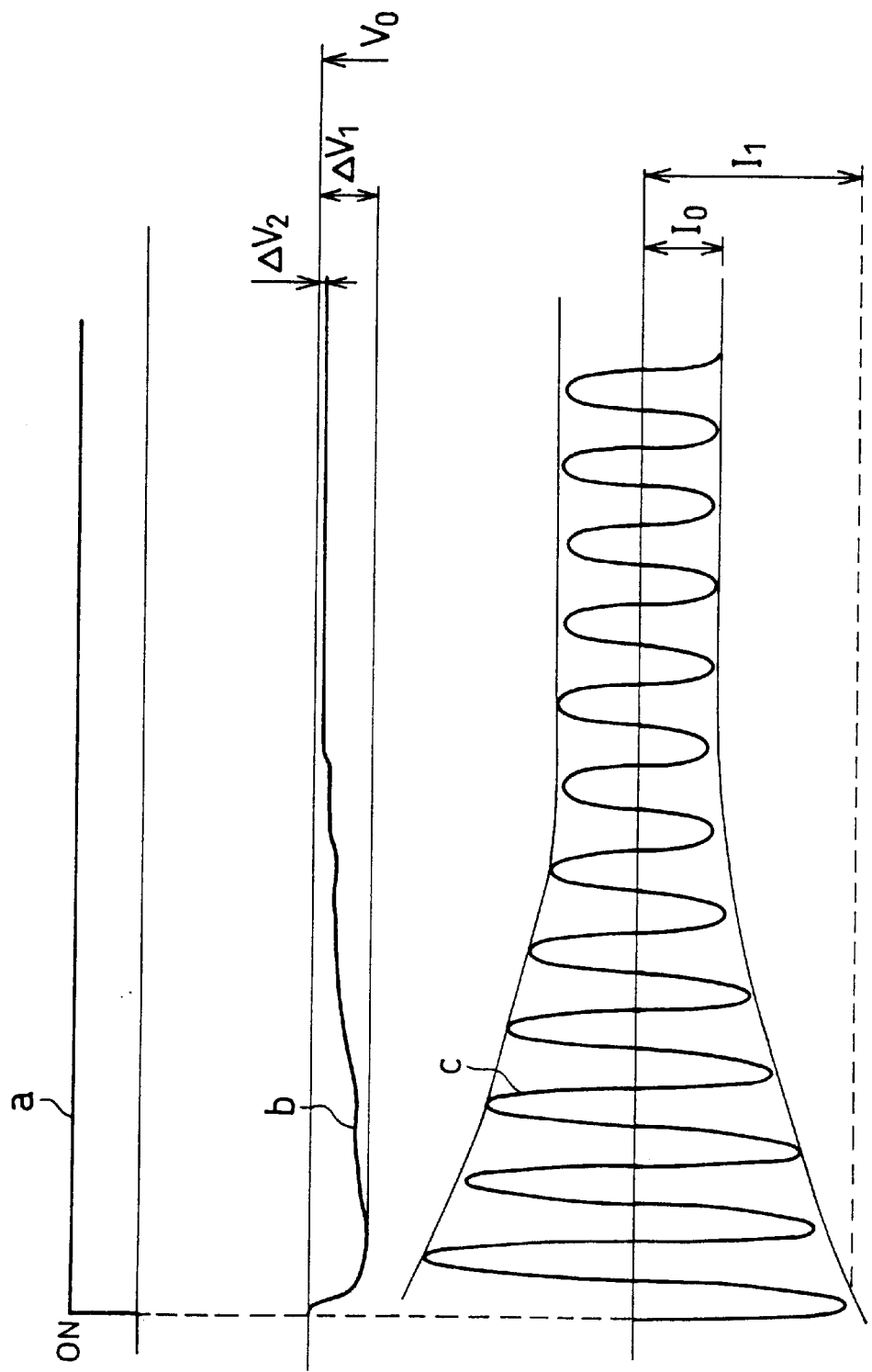
FIG. 7 is a view explaining a voltage drop and a current waveform.
Figure 8:
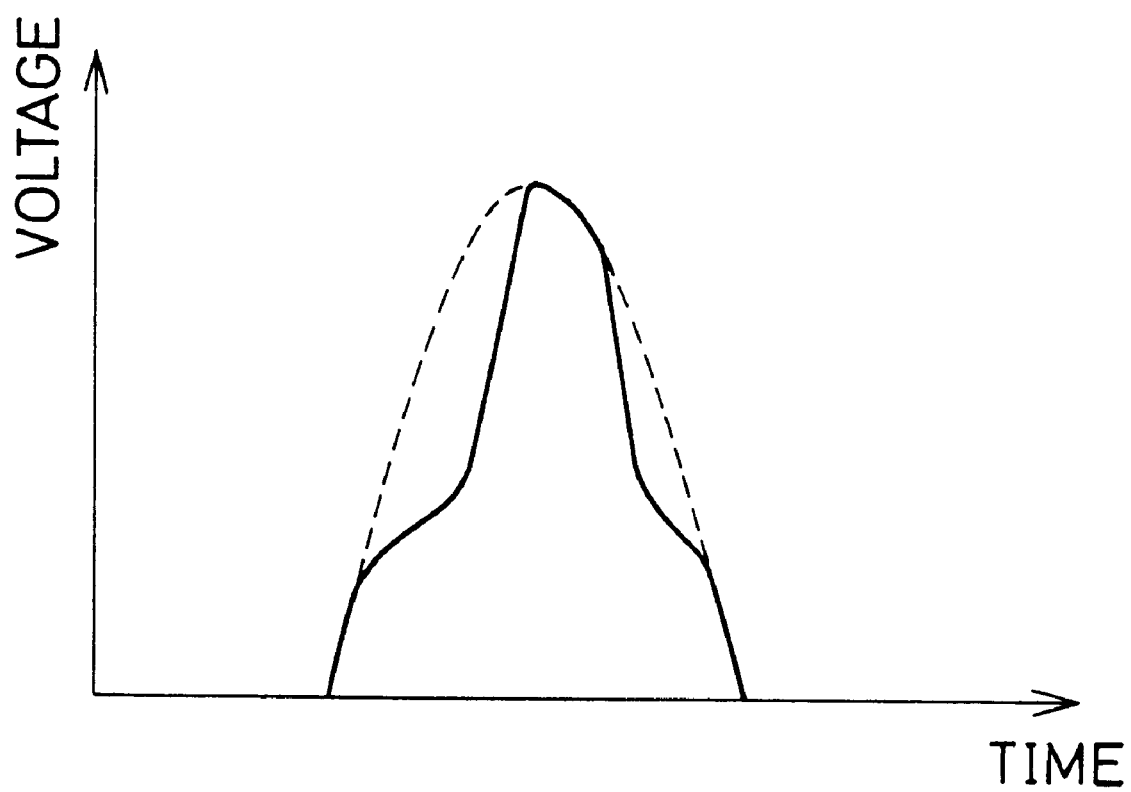
FIG. 8 is a view explaining the distortion of a current waveform.
Figure 9:
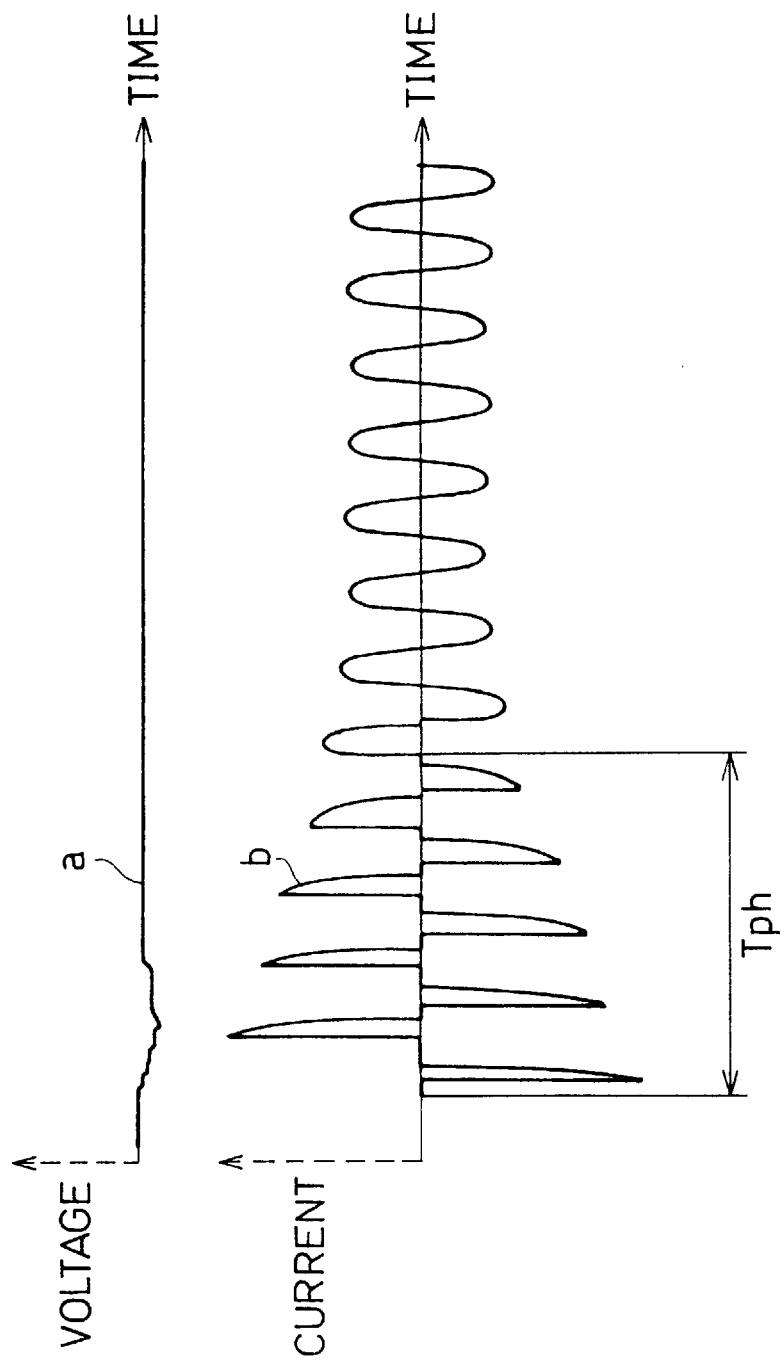
FIG. 9 is a view explaining the voltage drop and current waveform when the phase control is effected.

In a segment from the sixth through twenty-sixth half cycles in FIG. 6, the load is heated so as not to increase an amount of the voltage drop too much using a portion (attenuation curves $a_0$, $b_0$, $c_0$, and $d_0$) having a relatively large attenuation rate over time in an attenuation curve of the peak value of the current waveform more than once. In the following, how these attenuation curves are selected will be explained in detail with reference to FIGS. 10 through 12.

Figure 10:
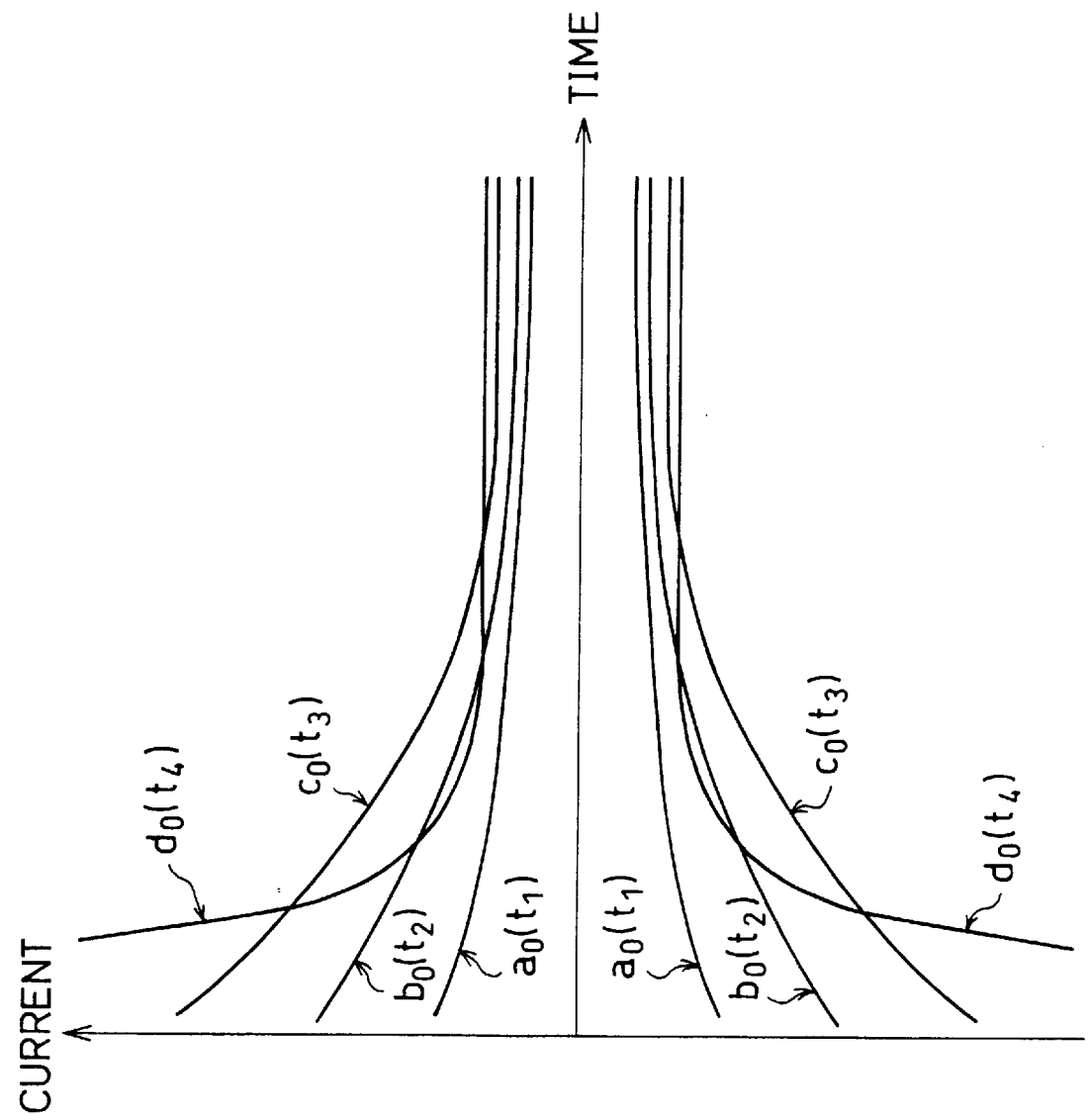
FIG. 10 is a view explaining a current waveform when the phase control is effected.

FIG. 10 shows the attenuation curves of the peak values of the current waveform when the phase control is effected for respective constant current passing times since the current passing has started. The attenuation curves $a_0$, $b_0$, $c_0$, and $d_0$ show cases where the current is passed for the current passing times $t_1$, $t_2$, $t_3$, and $t_4$ ($t_1<t_2<t_3<t_4$) in the half cycle, respectively. Here, $t_4$ represents the current passing time for the full current passing. As shown in FIG. 10, for the attenuation curves having shorter current passing times, a current value at the beginning of the current passing is smaller and so is an attenuation amount of the current value over time. On the other hand, for the attenuation curves having longer current passing times, a current value at the beginning of the current passing is larger and so is an attenuation amount of the current value over time. When the phase control is effected in the above manner to pass the current for a constant current passing time since the current passing has started, the attenuation rate saturates and the current value maintains substantially the constant value as the heat balance between the heat generated at the load and the heat released to the external reaches an equilibrium. In case of FIG. 10, the shorter the current passing time, the smaller the saturation value of the current. However, the relation in largeness of the current value at saturation for different current passing times varies with the kinds of the load, power source voltage and the like.

If the current passing time is long at the beginning of the current passing, a large current flows in because of a low resistance value. Thus, the initial current passing time must be short. However, if the current has been passed too long at a constant current passing time, the phase control is effected using a portion having a small attenuation rate in the attenuation curve, thereby extending the phase control period. Therefore, it is necessary to control the current passing not to cause a large voltage drop while keeping the phase control period shorter.

Figure 11:
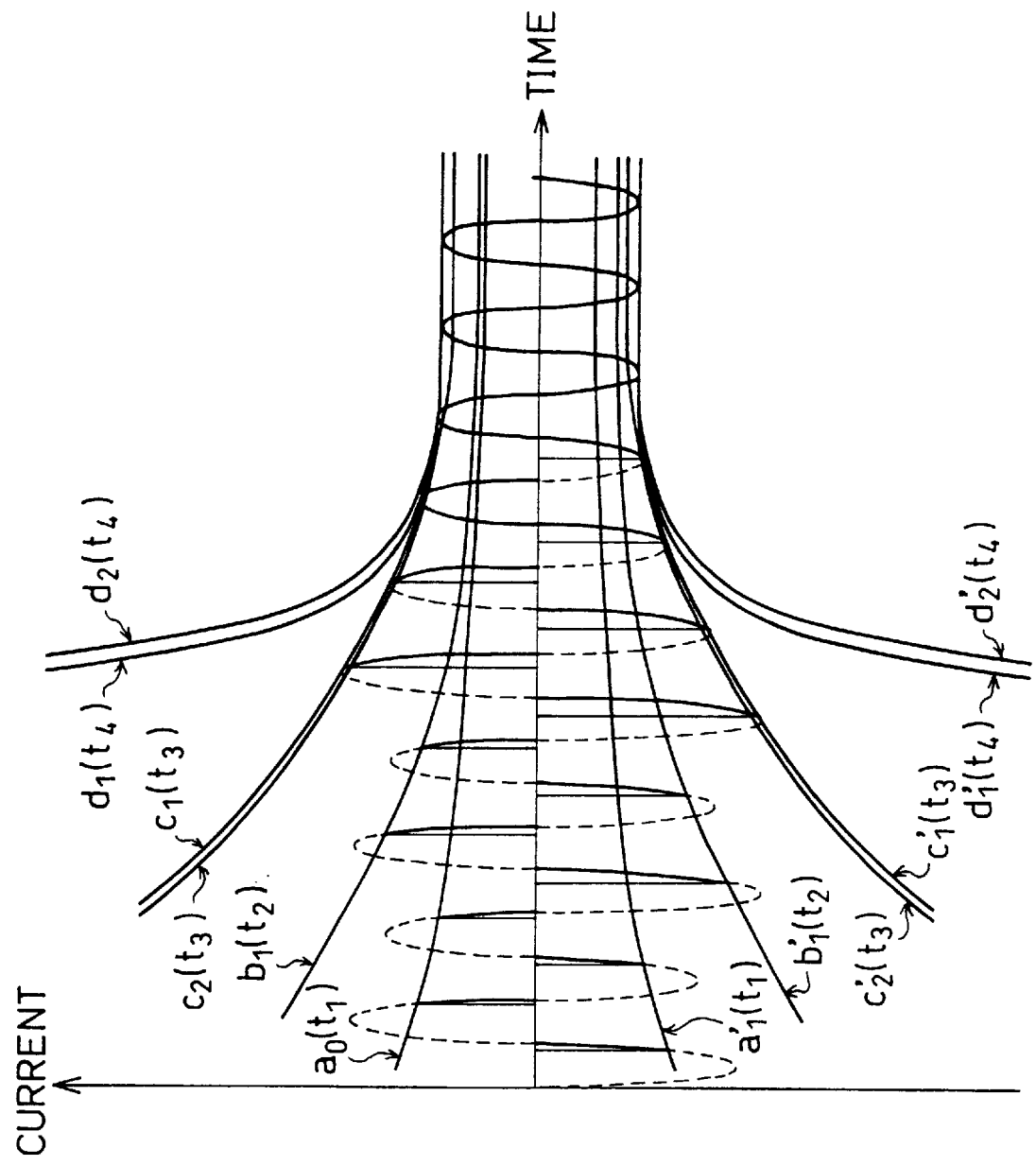
FIG. 11 is another view explaining a current waveform when the phase control is effected.
Figure 12:
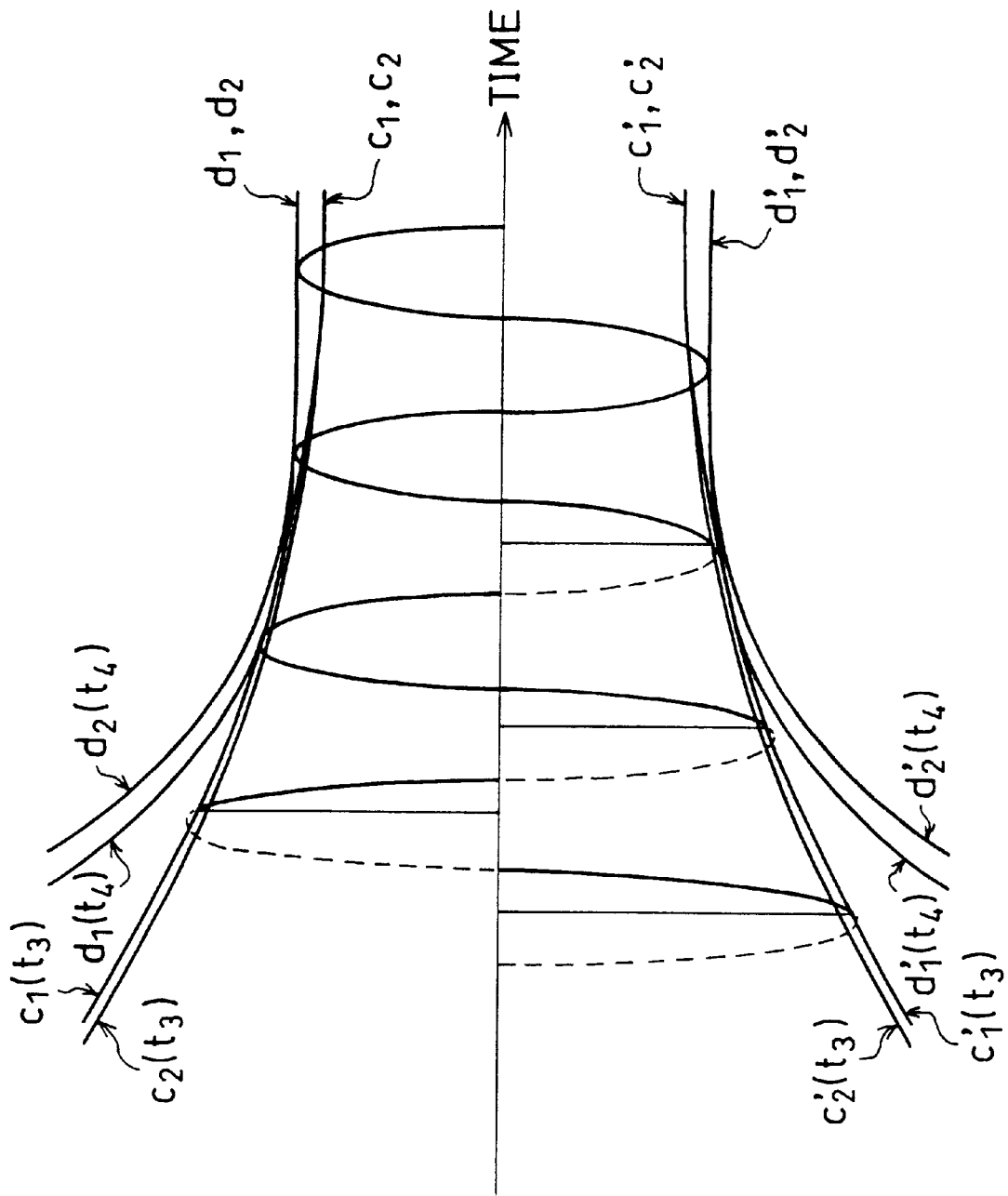
FIG. 12 is still another view explaining a current waveform when the phase control is effect.

FIG. 11 shows a case where the current passing is controlled using the attenuation curves of the peak value of the current waveform obtained when the phase control is effected for a constant current passing time in the above manner in increasing order of current passing times. FIG. 12 is a further detailed view of the above case.

At the beginning of the current passing, the phase control is effected for the short current passing time $t_1$ (attenuation curves $a_0$ and $a_1'$).

Then, before the attenuation rate over time of the peak value of the current waveform subjected to the phase control for the current passing time $t_1$ becomes too small, the current passing time is extended to $t_2$ (attenuation curves $b_1$ and $b_1'$). Here, the switching timing must be chosen carefully, so that the load heated to a predetermined temperature for the current passing time $t_1$ does not generate a large amount of the voltage drop even when the current passing time $t_1$ is switched to $t_2$. To be more specific, when an amount of the voltage drop exceeds a regulation value when the current passing time $t_1$ is switched to $t_2$, the switching timing must be delayed. On the other hand, when an amount of the voltage drop has too much margin to the regulation value when the current passing time $t_1$ is switched to $t_2$, the switching timing must be advanced.

The attenuation curve $b_1$ is shifted in a positive direction of the time axis for a certain amount with respect to the attenuation curve $b_0$ of FIG. 10 whose current passing time is set to $t_2$ from the start. This is because, in the case of FIG. 11, since the load is heated for the current passing time $t_1$ until the current passing time $t_1$ is switched to $t_2$, the temperature of the load has not risen much compared with the case of FIG. 10, where the load is heated for the current passing time $t_2$ from the start.

The phase control is kept effected for the current passing time $t_2$, and subsequently the phase control is effected for the current passing time $t_3$ (attenuation curves $c_1$ and $c_1'$). The timing of switching the current passing time $t_2$ to $t_3$ can be set in the same manner as setting the timing of switching the current passing time $t_1$ to $t_2$. The attenuation curve $c_1$ for the current passing time $t_3$ is also shifted in the positive direction of the time axis for a certain amount. This is because, since the load is heated for the current passing times $t_1$ and $t_2$ until the current passing time $t_2$ is switched to $t_3$, the temperature of the load has not risen much compared with a case where the load is heated for the current passing time $t_3$ from the start.

Then, a half cycle for the full current passing (current passing time $t_4$), which is represented by the attenuation curve $d_1$, is inserted, after which the current is passed for the current passing time $t_3$. Here, the peak value of the current waveform is on the attenuation curve $c_2'$. The attenuation curve $c_2'$ is shifted slightly in the negative direction of the time axis with respect to the attenuation curve $c_1'$. This is because, since the half cycle for the full current passing is inserted, the temperature of the load has risen higher than in the case where the load is heated for the current passing time $t_3$ instead of the full current passing.

Then, the phase control is switched to the zero crossing control (current passing time $t_4$), which is represented by the attenuation curves $d_2$ and $d_2'$. The controls can be switched when the load is heated to a temperature at which an amount of the voltage drop does not exceed the regulation value even if the full current passing is effected. The attenuation curves $d_2$ and $d_2'$ are shifted slightly in the positive direction of the time axis with respect to the attenuation curves $d_1$ and $d_1'$. This is because, since the load is heated for the current passing time $t_3$, which is shorter than the current passing time $t_4$ for the full current passing, after one half cycle for the full current passing is inserted, the temperature of the load has not risen much compared with a case where the load has been heated by the full current passing.

The control using the current passing time $t_3$ (attenuation curves $c_1$ and $c_1'$, and $c_2$ and $c_2'$) is switched to the zero crossing control (current passing time $t_4$) where the attenuation rate in the attenuation curve in the zero crossing control (current passing time $t_4$) is small. Here, "where the attenuation rate in the attenuation curve is small in the zero crossing control" is defined as a portion where an amount of the voltage drop does not exceed the regulation value even when the zero crossing control is effected, in other words, even when the full current passing is effected continuously. The current passing time can be changed in such a portion.

As has been explained, an amount of the voltage drop can be made smaller than a predetermined value while keeping the phase control period shorter by heating the load using the attenuation curves of the peak value of the current waveform obtained when effecting the phase control for respective constant current passing times in increasing order of the current passing times, and also using a portion having relatively large attenuation rate over time.

As has been explained above, the present invention reduces the voltage drop, distortion of the current waveform, and conduction noise by cutting the phase control period shorter. The very important characteristics of the present invention in this regard are as follow:

First Characteristics: a current passing time such that does not trigger a large voltage drop that varies depending on the load and a temperature at that moment is selected, and the phase control is effected for several times for the current passing time as long as the above-selected current passing time. Here, only the half cycles having a large attenuation rate of the peak value of the current waveform are used. When the peak value of the current waveform in these half cycles becomes satisfactorily small compared with the peak value before the current passing, the current passing time is extended further, and the phase control is effected repetitively in the same manner using only the half cycles having a large attenuation rate of the peak value of the current waveform until the peak value of the current waveform of these half cycles becomes satisfactorily small compared with the peak value before the current passing. According to this arrangement, the load can be heated without using the half cycles having a small attenuation rate of the peak value of the current waveform, thereby making it possible to shorten the phase control period. Consequently, not only the voltage drop can be reduced effectively, but also the distortion of the current waveform and conduction noise can be reduced effectively.

Second Characteristics: The load is heated in such a manner that a current value per unit time will not become too large, and that half cycles of the current waveform having a large current value will not be continuous. This is made possible by placing a half cycle of the current waveform having a large current value between half cycles of the current waveform having a small current value. Consequently, not only the voltage drop, but also the distortion of the current waveform and the conduction noise can be reduced effectively. In practice, a half cycle having a long current passing time T2 is placed after a half cycle having a short current passing time T1, and a half cycle having a short current passing time T3 is placed after the above half cycle having the current passing time T2. It is more effective when these half cycles are placed in the above manner at the same timing when the current passing times are changed. For example, the corresponding arrangements in FIG. 6 are: a relation among the second through fourth half cycles; a relation among the fifth through seventh half cycles; a relation among the tenth through twelfth half cycles; a relation among the twenty-fourth through twenty-seventh half cycles; and a relation among the twenty-seventh through twenty-ninth half cycles. When the short current passing time T1, long current passing time T2, and short current passing time T3 are sequentially placed, a current is passed for the substantially constant current passing time after the current was passed for the above-arranged current passing times. However, the substantially constant current passing time must be selected carefully so that it does not cause an amount of the voltage drop to exceed the regulation value.

To be more specific, when the control having the second characteristics is effected, let a waveform pattern P1 be a portion of a waveform of the load current where an amount of a voltage drop is equal to or below a predetermined amount when the current is passed through a phase control R1 for effecting the phase control on the load for a constant current passing time for each polarity from a beginning of a current passing, then the current is passed through the load using the control having the second characteristics, and then the current is passed through the load using a third control pattern, in which the current passing time for each polarity is same as the current passing time for the same polarity in the phase control R1, and a resulting waveform of the load current is included in the wave pattern P1. Here, the predetermined value actually means the regulation value of the voltage drop.

In the above example, both the control having the first characteristics for raising the attenuation rate of the peak value of the load current, and the control having the second characteristics for extending or shortening the current passing time are effected. However, both the controls do not have to be effected together, and effecting either the control having the first characteristics or the control having the second characteristics can attain the effects of suppressing the supply voltage drop, preventing the distortion of the supply current waveform, and reducing the conduction noise.

Also in the above example, the control having the second characteristics is followed by the zero crossing control. Consequently, the supply voltage drop can be suppressed, the distortion of the supply current waveform can be prevented, and the conduction noise can be reduced more effectively. However, the arrangement is not limited to the above disclosure, and the control having the second characteristics does not have to be effected right before the zero crossing control.

Moreover, in the above example, when the control having the second characteristics is effected, the voltage supply for the current passing time T2 is substantially the full current passing for the entire half cycle, and the current passing times T1 and T3 are equal. According to this arrangement, the supply voltage drop can be suppressed and the distortion of the supply current waveform can be prevented, and the conduction noise can be reduced more effectively. However, the arrangement is not limited to the above disclosure, and the current passing times T1 and T3 do not have to be equal. The voltage supply for the current passing time T2 does not have to be substantially or exactly the full current passing for the entire half cycle, either.

Further, in the above example, the control having the second characteristics is effected repetitively (twice) before being switched to the zero crossing control. Consequently, the phase control can be readily switched to the zero crossing control. Also, the supply voltage drop can be suppressed, the distortion of the supply current waveform can be prevented, and the conduction noise can be reduced more effectively. However, the arrangement is not limited to the above disclosure, and the control having the second characteristics may be effected only once.

Furthermore, in the above example, the control having the second characteristics is effected when the current passing time is extended by the phase control to around ¼ cycle of the supply voltage waveform. Consequently, the supply voltage drop can be suppressed, the distortion of the supply current waveform can be prevented, and the conduction noise can be reduced more effectively. However, the arrangement is not limited to the above disclosure, and the control having the second characteristics can be effected under other circumstances.

In the above example, while the control having the first characteristics is effected, the current passing time is extended when the attenuation rate of the load current drops to or below a predetermined threshold value. Also, the threshold value of the attenuation rate of the load current is set in such a manner that a total repetitive number of the phase control is at least a least necessary number for making a voltage drop of the supply voltage within a target value, and that a total repetitive number of the phase control is up to a maximum number for making distortion of the supply current waveform and conduction noise within their respective target values. Consequently, the supply voltage drop can be suppressed, the distortion of the supply current waveform can be prevented, and the conduction noise can be reduced more effectively. However, the arrangement is not limited to the above disclosure.

In the above example, while the control having the first characteristics is effected, the current passing time is extended right before the attenuation rate of the peak value of the load current saturates. Consequently, the supply voltage drop can be suppressed, the distortion of the supply current waveform can be prevented, and the conduction noise can be reduced more effectively. However, the arrangement is not limited to the above disclosure.

In the above example, while the control having the first characteristics is effected, it is arranged that the attenuation rate of the peak value of the load current in the first half cycle after the current passing time is extended for one polarity becomes larger than the attenuation rate of the peak value of the load current in the last half cycle before the current passing time is extended for the same polarity. Consequently, the supply voltage drop can be suppressed, the distortion of the supply current waveform can be prevented, and the conduction noise can be reduced more effectively. However, the arrangement is not limited to the above disclosure.

In addition, in the above example, while the control having the first characteristics is effected, there is formed a segment, in which the current passing times for a voltage having the same polarity are constant. Further, in such a segment, the current passing time for a voltage having one polarity is shorter than the current passing time for a voltage having the other polarity. Consequently, the supply voltage drop can be suppressed, the distortion of the supply current waveform can be prevented, and the conduction noise can be reduced more effectively. However, the arrangement is not limited to the above disclosure.

In the above example, the supply voltage waveform has two different polarities: the first polarity and the second polarity. However, the arrangement is not limited to the above disclosure, and the supply voltage waveform may be a three-phase A/C, or may have only one polarity.

In addition, the current passing time can be set by controlling a delay time from the zero crossing point like in the above example, or by controlling the phase lag angle with respect to the zero crossing point.

In the above example, the phase control is effected while the current passing time is extended up to half the half cycle in an initial stage of a current passing; and then the current is passed for substantially a constant current passing time using the control having the first characteristics until the peak value of the load current attenuates to or below a predetermined value. Here, the predetermined value practically means a value such that does not make an amount of the voltage drop exceed the regulation value even when the following attenuation curve of the peak value of the current waveform with the extended current passing time is used.

The flicker test, harmonics test, and conduction noise test are conducted using apparatuses in which the phase control having a modified pattern adopting the present invention is effected, and apparatuses in which a conventional monotonous phase control for always passing the current for a constant time effected, and the results are set forth in Table 4 below. In Table 4, a mark "Δ" indicates that the result is barely within the limit, and a mark "⊙" means the result is within the limit with a sufficient margin.

TABLE 4

| | | CONTROL PATTERN | |
|---|---|---|---|
| | | MONOTONOUS PHASE CONTROL | MODIFIED PATTERN |
| PHASE CONTROL TIME (ms) | COPY MODE STANDBY MODE | 750 380 | 290 290 |
| EVALUATION ITEMS | LIMIT | | |
| FLICKER TEST | LONG 0.65 SHORT 1.0 | 0.52(⊙) 0.87(⊙) | 0.59(⊙) 0.86(⊙) |
| HARMONICS TEST | | Δ | ⊙ |
| CONDUCTION NOISE | | — | LESS THAN MONOTONOUS PHASE CONTROL |

As can be understood from Table 4 above, as to the flicker test, the modified pattern can attain substantially the same level obtained by the conventional monotonous phase control, and passes the test. As to the harmonics test, the monotonous phase control shows a result that no margin is secured with respect to the harmonics limit, and some apparatuses fail the test. In contrast, the modified pattern shows a result that a sufficient margin is secured, and therefore, the result is very satisfactory. In addition, the modified pattern reduces the conduction noise effectively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power control unit including switching means for adjusting a load current passing through a load having positive resistance characteristics with respect to temperatures by controlling a supply voltage having at least one polarity and supplied from an A/C power source to said load through a phase control, in which a current passing time in a half cycle of a supply voltage waveform is set before a current starts to pass, wherein said switching means effects the phase control on said supply voltage waveform so as to form a first control pattern, in which said switching mean supplies a voltage for a current passing time T1;

said switching means then supplies a voltage for a current passing time T2, said current passing time T2 being longer than said current passing time T1; and said switching means then supplies a voltage for a current passing time T3, said current passing time T3 being shorter than said current passing time T2, said switching means effecting the chase control for forming the first control pattern between a phase control stage which increases a current passing time in time series and a zero-crossing control, a current passing time of a last half cycle in said phase control stage being said current passing time T1.

2. The power control unit of claim 1, wherein said current passing times T1 and T3 are equal.

3. The power control unit of claim 2, wherein the voltage supplied for said current passing time T2 is substantially a full current passing for an entire half cycle.

4. The power control unit of claim 1, wherein said first control pattern is repeated more than once.

5. The power control unit of claim 1, wherein the voltage supplied for said current passing time T2 is a full current passing for an entire half cycle.

6. The power control unit of claim 1, wherein said switching means effects the phase control using said first control pattern when the current passing time is extended by the phase control to around ¼ cycle of said supply voltage waveform.

7. The power control unit of claim 1, wherein said supply voltage waveform has one polarity.

8. The power control unit of claim 1, wherein said supply voltage waveform is three-phase A/C.

9. The power control unit of claim 1, wherein said supply voltage waveform has a first polarity and a second polarity, said second polarity being different from said first polarity.

10. The power control unit of claim 9, wherein said switching means effects the phase control on said supply voltage waveform so as to form said first control pattern, in which said switching means supplies the voltage as having said first polarity for said current passing time T1;

said switching means the supplies the voltage as having said second polarity for said current passing time T2; and said switching mean then supplies the voltage as having said first polarity for said current passing time T3.

11. The power control unit of claim 1, wherein, if a waveform pattern P1 is a portion of a waveform of said load current where an amount of a voltage drop is equal to or below a predetermined amount when the current is passed through a phase control R1 for effecting the phase control on said load for a constant current passing time for each polarity from a beginning of a current passing, then, said switching means passes the current through said load using said first control pattern, and said switching means then passes the current through said load using a third control pattern, in which the current passing time for each polarity is the same as the current passing time for a same polarity in said phase control R1, and a resulting waveform of said load current is included in said wave pattern P1.

12. A power control unit including switching means for adjusting a load current passing through a load having positive resistance characteristics with respect to temperatures by controlling a supply voltage having at least one polarity and supplied from an A/C power source to said load through a phase control, in which a current passing time in a half cycle of a supply voltage waveform is set before a current starts to pass, wherein said switching means effects the phase control on said supply voltage waveform to perform a second control pattern at least once, in which said switching means passes the current while keeping the current passing time substantially constant;

said switching means extends the current passing time before an attenuation rate of a peak value of a resulting load current saturates; and said switching means then passes the current while keeping an extended current passing time substantially constant.

13. The power control of claim 12, wherein said switching means extends the current passing time when the attenuation rate of said load current drops to or below a threshold value.

14. The power control unit of claim 13, wherein said switching means effects the phase control by setting said threshold value of the attenuation rate of said load current in such a manner that:

a total repetitive number of the phase control is at least a least necessary number for making a voltage drop of said supply voltage within a target value; and the total repetitive number of the phase control is up to a maximum number for making distortion of a supply current waveform and conduction noise within respective target values.

15. The power control unit of claim 12, wherein said switching means extends the current passing time right before the attenuation rate of the peak value of said load current saturates.

16. The power control unit of claim 12, wherein said switching means effects the phase control using said second control pattern, so that the attenuation rate of the peak value of said load current in a first half cycle after the current passing time is extended for one polarity is greater than the attenuation rate of the peak value of said load current in a last half cycle before the current passing time is extended for said one polarity.

17. The power control unit of claim 12, wherein:

said switching means effects the phase control using said second control pattern; and said switching means then effects the phase control on said supply voltage waveform so as to form a first control pattern, in which said switching means supplies a voltage for a current passing time T2, said current passing time T2 being longer than a current passing time T1 in a last half cycle in said second control pattern, and said switching means then supplies the voltage for a current passing time T3, said current passing time T3 being shorter than said current passing time T2.

18. The power control unit of claim 17, wherein said switching means effects the phase control using said first control pattern when the current passing time is extended by the phase control using said second control pattern to around ¼ cycle of said supply voltage waveform.

19. The power control unit of claim 12, wherein said supply voltage waveform has one polarity.

20. The power control unit of claim 12, wherein said supply voltage waveform is three-phase A/C.

21. The power control unit of claim 12, wherein said supply voltage waveform has a first polarity and a second polarity, said second polarity being different from said first polarity.

22. The power control unit of claim 21, wherein there is formed a segment where the current passing times for a voltage having a same polarity are constant.

23. The power control unit of claim 22, wherein, within said segment, the current passing time for a voltage having one polarity is shorter than the current passing time for a voltage having another polarity.

24. The power control unit of claim 21, wherein:

said switching means effects the phase control using said second control pattern;

said switching means then supplies a voltage having said second polarity for a current passing time T2, said current passing time T2 being longer than a current passing time T1 in a last half cycle in said second control pattern for a voltage having said first polarity; and said switching means then supplies a voltage having said first polarity for a current passing time T3, said current passing time T3 being shorter than said current passing time T2.

25. The power control unit of claim 12, wherein said switching means, during said second control pattern, passes the current for substantially a constant current passing time for at least one polarity of said supply voltage;

said switching means extends the current passing time for said at least one polarity before an attenuation rate of a peak value of a resulting load current saturates; and said switching means then passes the current for said extended current passing time for said polarity while keeping said extended current passing time substantially constant.

26. The power control unit of claim 12, wherein:

said switching means effects the phase control while extending the current passing time up to half the half cycle in an initial stage of a current passing; and said switching means then passes the current for substantially a constant current passing time in said second control pattern until the peak value of said load current attenuates to or below a predetermined value.

27. A power control unit storing a phase control pattern, in which a current passing time for a halogen lamp is divided into a plurality of segments and an average current passing time of each segment is gradually increased, said power control unit effecting said phase control pattern in a period from a start of current passing to a start of a zero-crossing phase control, wherein current passing is stopped for a predetermined time with respect to a load in a certain period during said period from the start of current passing to the start of the zero-crossing phase control.

28. The power control unit of claim 27, wherein the current passing time before the predetermined time when current passing is stopped is substantially the same as the current passing time when current passing is resumed after the predetermined time.

29. The power control unit of claim 28, wherein a polarity of a current passed before the predetermined time when current passing is stopped is opposite a polarity of a current passed when current passing is resumed after the predetermined time.

30. A method of adjusting a load current passing through a load having positive resistance characteristics with respect to temperature by controlling a supply voltage having at least one polarity, comprising the steps of:

increasing current passing times in time series during a first control stage;

adjusting current passing times in a second control stage to include in sequence at least first through third current passing times, the second current passing time being longer than the first and third current passing times; and performing a zero-crossing control of the load current in a third control stage.

31. The method of adjusting a load current of claim 30, wherein a current passing time of a last half cycle of the first control stage is the same as the first current passing time in the second control stage.

32. The method of adjusting a load current of claim 30, further comprising the step of stopping current passing during a fourth control stage, the fourth control stage being between the first and second control stages.

* * * * *